US010718107B2

(12) United States Patent
Martin

(10) Patent No.: US 10,718,107 B2
(45) Date of Patent: Jul. 21, 2020

(54) PYRAMIDAL HOUSING AUTONOMOUS AND SUITABLE FOR DIFFERENT ENVIRONMENTAL CONDITIONS

(71) Applicant: Dario Rolando Martin, Nequen Capital-Provincia de Neuquen (AR)

(72) Inventor: Dario Rolando Martin, Nequen Capital-Provincia de Neuquen (AR)

( * ) Notice: Subject to any disclaimer, the term of this patent is extended or adjusted under 35 U.S.C. 154(b) by 0 days.

(21) Appl. No.: 15/987,378

(22) Filed: May 23, 2018

(65) Prior Publication Data

US 2018/0340327 A1    Nov. 29, 2018

(30) Foreign Application Priority Data

May 24, 2017    (AR) .............................. 20170101430

(51) Int. Cl.
*E04B 1/19*      (2006.01)
*H02S 10/12*     (2014.01)
(Continued)

(52) U.S. Cl.
CPC .............. *E04B 1/19* (2013.01); *E04B 1/2403* (2013.01); *E04B 1/32* (2013.01); *E04H 1/00* (2013.01); *E04H 9/00* (2013.01); *F03D 9/25* (2016.05); *F03D 9/45* (2016.05); *F24D 3/005* (2013.01); *H02S 10/12* (2014.12); *H02S 20/22* (2014.12); *E04B 1/7654* (2013.01); *E04B 2001/0069* (2013.01); *E04B 2001/199* (2013.01); *E04B 2001/249* (2013.01); *E04B 2001/2463* (2013.01); *E04B 2001/2466* (2013.01);
(Continued)

(58) Field of Classification Search
CPC . E04B 1/19; E04B 1/32; E04B 1/2403; E04B 2001/0069; E04B 2103/06; E04B 2001/2463; E04B 2001/249; E04B 2001/2481; E04B 2001/2466; E04B 2001/199; E04B 1/7654; F24D 3/005; F03D 9/25; F03D 9/45; H02S 20/22; H02S 10/12; H02S 40/44; E04F 13/12; E04C 2003/0465; E04C 3/07; E04C 3/32; E04H 9/024
USPC .......................................................... 52/82
See application file for complete search history.

(56) References Cited

U.S. PATENT DOCUMENTS 2,278,066 A * 3/1942 Domack .................. H03B 5/10
331/170
2,278,956 A * 4/1942 Wagner ................. E04B 1/3211
52/206
(Continued)

FOREIGN PATENT DOCUMENTS

FR        2411283 A1 *  7/1979  .............. E04B 7/20
GB        2441768 A  *  3/2008  .............. F03D 3/02
KR    20110124679 A  * 11/2011  ........... F24S 30/422

*Primary Examiner* — Jeanette E Chapman

(57) ABSTRACT

Pyramidal housing autonomous and suitable for different environmental conditions. Its pyramidal structure (1) is made up of metal profiles (10) that include corner pillars (10a), side pillars (10b), beams or cross structures of mezzanine (17)(19) and rafters that form the openings (4), being the pillars anchored to the foundation beam (13); over this structure, the outer covers (15) that form the pyramidal walls (15a) are mounted; in the blind sections of the outer cover (15) of the upper floor there are mounting supports (32) for arrangements of solar panels (30), while at the apex (12) there is a wind energy generator; other blind sectors allow the mounting of a solar heater (50).

30 Claims, 15 Drawing Sheets

(51) Int. Cl.
| | |
|---|---|
| *H02S 20/22* | (2014.01) |
| *E04B 1/24* | (2006.01) |
| *F03D 9/45* | (2016.01) |
| *F03D 9/25* | (2016.01) |
| *F24D 3/00* | (2006.01) |
| *E04B 1/32* | (2006.01) |
| *E04H 1/00* | (2006.01) |
| *E04H 9/00* | (2006.01) |
| *E04H 9/02* | (2006.01) |
| *E04B 1/76* | (2006.01) |
| *E04C 3/32* | (2006.01) |
| *E04C 3/07* | (2006.01) |
| *E04C 3/04* | (2006.01) |
| *H02S 40/44* | (2014.01) |
| *E04B 1/00* | (2006.01) |
| *E04F 13/12* | (2006.01) |

(52) U.S. Cl.
CPC ... *E04B 2001/2481* (2013.01); *E04B 2103/06* (2013.01); *E04C 3/07* (2013.01); *E04C 3/32* (2013.01); *E04C 2003/0465* (2013.01); *E04C 2003/0473* (2013.01); *E04F 13/12* (2013.01); *E04H 9/024* (2013.01); *F05B 2240/9112* (2013.01); *H02S 40/44* (2014.12)

(56) References Cited

U.S. PATENT DOCUMENTS

| | | | | | |
|---|---|---|---|---|---|
| 3,177,618 | A | * | 4/1965 | Jacob | E04B 7/22 52/265 |
| 3,283,693 | A | * | 11/1966 | Howell | E04H 1/02 454/186 |
| 3,354,590 | A | * | 11/1967 | Gilroy | E04B 1/24 52/299 |
| 3,617,086 | A | * | 11/1971 | King | B60P 3/34 296/172 |
| 3,714,746 | A | * | 2/1973 | Barlow | E04B 1/3442 52/66 |
| 3,862,526 | A | * | 1/1975 | Loughlin | E04B 1/3442 296/173 |
| 5,076,031 | A | * | 12/1991 | Hancock | E04H 15/18 135/122 |
| 5,501,046 | A | * | 3/1996 | Hattingh | E04B 1/34321 52/266 |
| 6,470,632 | B1 | * | 10/2002 | Smith | E04B 7/022 52/642 |
| 7,921,610 | B2 | * | 4/2011 | Boatwright | E04B 1/24 52/639 |
| 9,228,565 | B1 | * | 1/2016 | Culver | F03D 3/005 |
| 2016/0108893 | A1 | * | 4/2016 | Agtuca | H02S 10/12 290/44 |

* cited by examiner

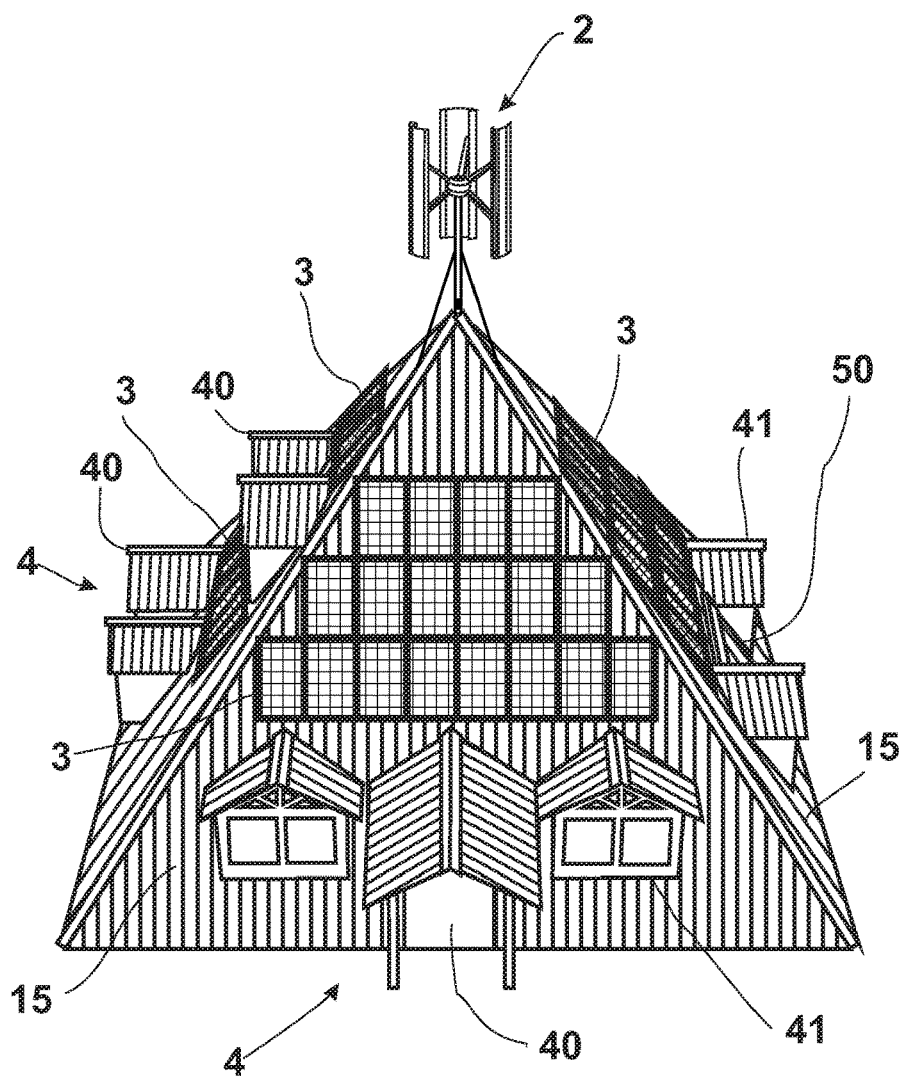
FIG. 12A
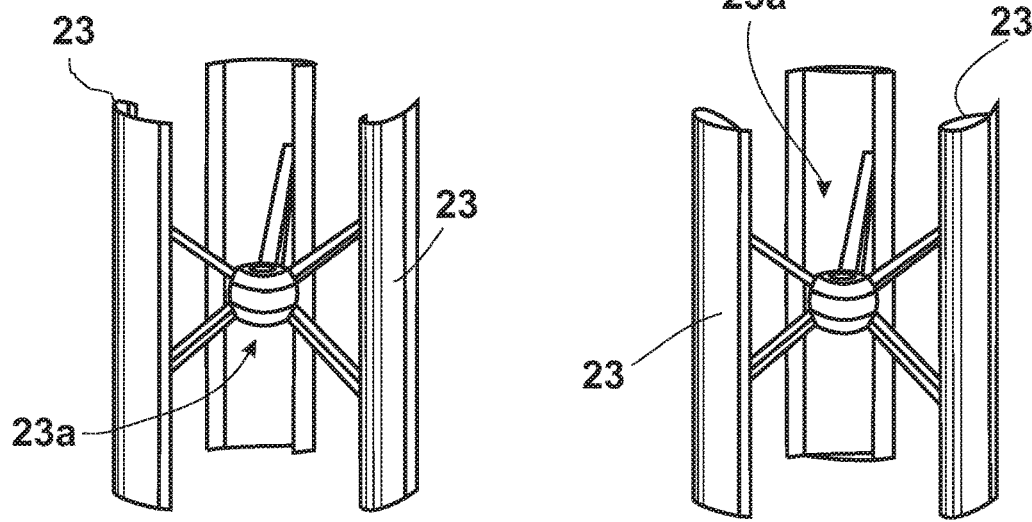
FIG. 12B  FIG. 12C

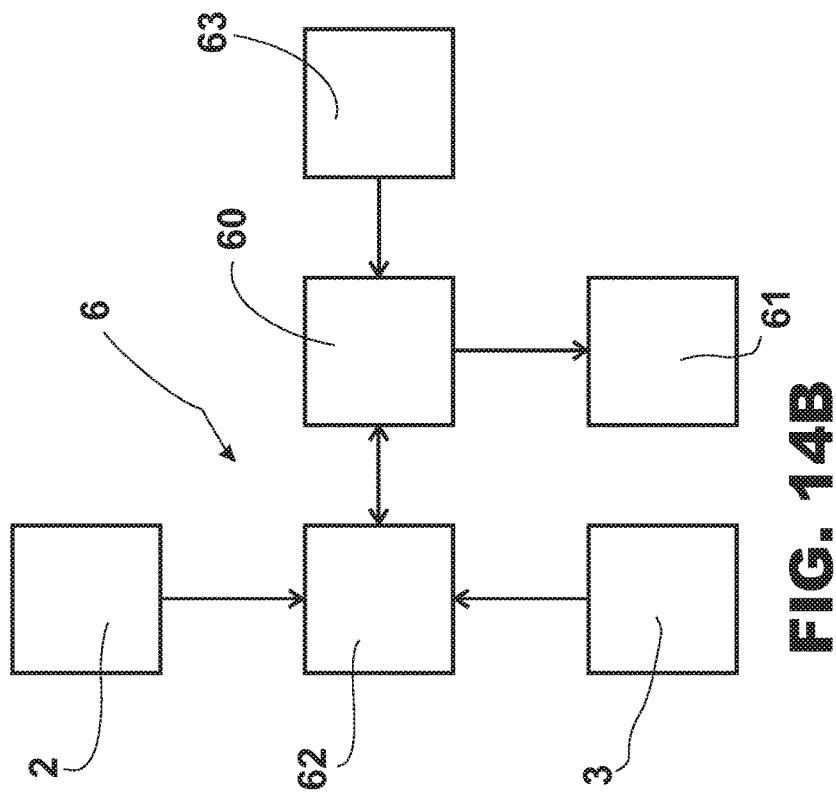
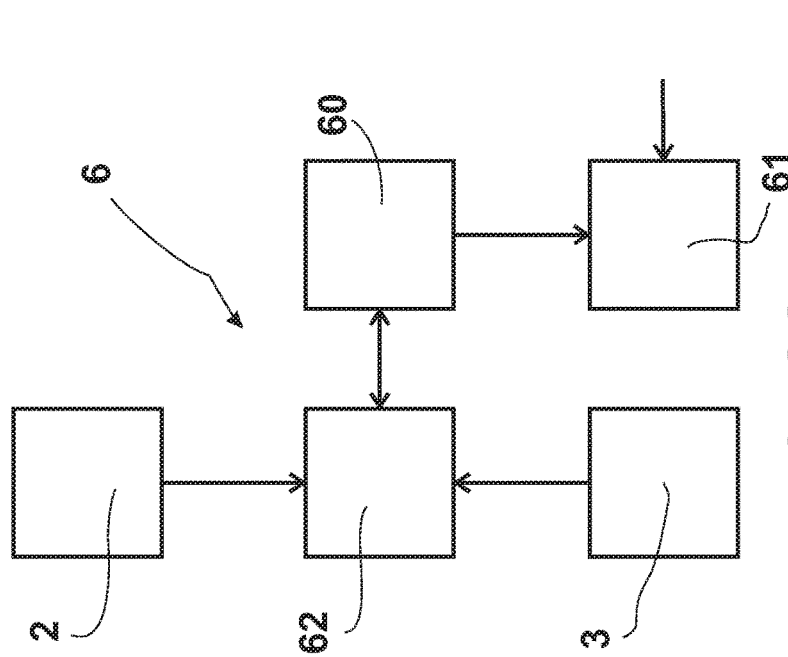
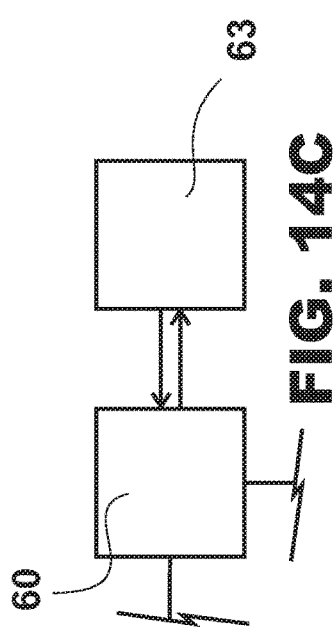

PYRAMIDAL HOUSING AUTONOMOUS AND SUITABLE FOR DIFFERENT ENVIRONMENTAL CONDITIONS

FIELD OF THE INVENTION

The present invention refers to the field of construction.

More particularly, it refers to a pyramidal housing autonomous and suitable for different environmental conditions, the metallic structure of which allows both the assembly of elements such as solar panels, wind generators and solar water heaters, and the obtaining of an earthquake structural resistance. Furthermore, its pyramidal shaping and its walls with metal outer cover make it suitable for different climates and environments.

PRIOR ART

Up to date, different types of pyramidal building structures are known. From the oldest ones of huge dimensions and mainly structured in huge blocks of stone materials, related with each other through different union techniques and materials.

Different housings that have elements for the exploitation of clean energies such as solar and wind energy are also known.

However, so far no purely pyramidal housing is known, which structural characteristics allow its adaptation to any climate and environment, including seismic zones, and that further allows its normal functioning both in inhabited areas, fitted with electricity and water services, and in isolated areas that lack access to any service.

In general, both the technical features and the equipment of the traditional building structures, pyramidal or not, offer great variations according to the characteristics of the area where they are located. The same applies in relation to the seismic features or the requirements of energy and services available.

ADVANTAGES AND PURPOSES

The characteristic of the pyramidal structure of the present housing is that it turns out to be also suitable for both seismic and non-seismic areas, as well as for isolated areas that lack of access to energy resources and/or essential public services such as electricity.

Its pyramidal shaping allows the structuring of the walls with a highly resistant outer cover that in the traditional constructions is only used for roofs.

The arrangement of the openings is made in such a way that the two compartments (ground floor and first floor) have the sufficient ventilation and natural illumination, but leaving some blind zones in which the metal structure provides some mounting supports for arrangements of solar panels.

Therefore, it not only allows the mounting of solar panels, wind generators and solar water heaters, but the link is extremely firm since they are fixed to the metal pyramidal structure.

This same structure has earthquake resistance since all its pillars are mounted in a continuous foundation beam. Furthermore, the different elements such as the crossbeam pillars, cross structures, etc., are structured in metal profiles of different measures, for example, of "C" or double "C" welded type, which grants great resistance and relative low cost.

The mentioned structural resistance allows the inclusion of cross structures that divide the inside of the structure in a bottom compartment (or ground floor), an upper compartment (or upper floor or first floor) and a functional attic place in which the different elements such as water tanks can be placed.

The confluence of the pillars in the apex of the pyramidal structure allow the placement of a mounting base for a wind generator.

DRAWINGS

For better clarity and understanding of the object of the invention, it is illustrated with several figures where it has been represented in one of its preferred embodiments, everything as an illustrative example, without limitation:

FIGS. 1A-1C show the present housing and its structure, being:

FIG. 1A, a front view, in elevation, of the present autonomous pyramidal housing;

FIG. 1B, a front view, in elevation, of the pyramidal structure made up of metal profiles, that is shown deprived of the side walls and the outer cover and FIG. 1C, an upper view, in plant, of the foundation beam, where the constitution of its structure with its peripheral, diagonal and cross sections can be distinguished.

Figure 1B:
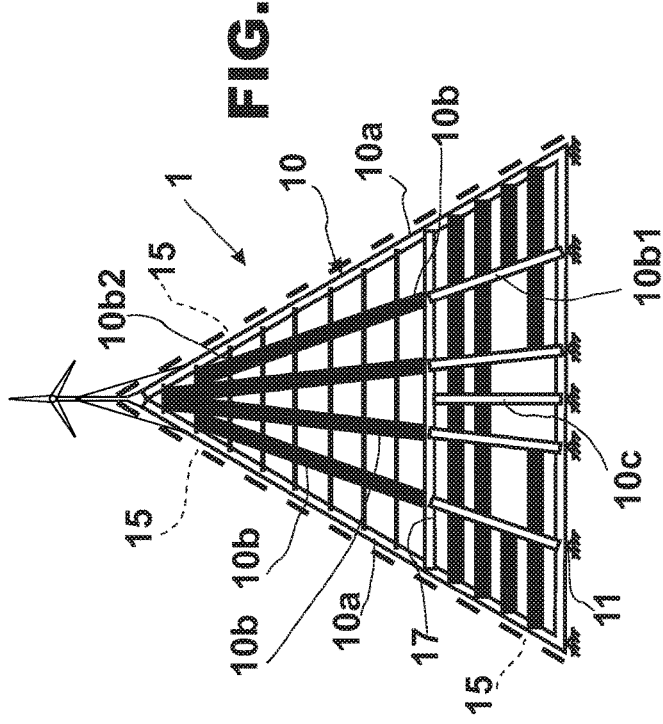
Figure 1A:
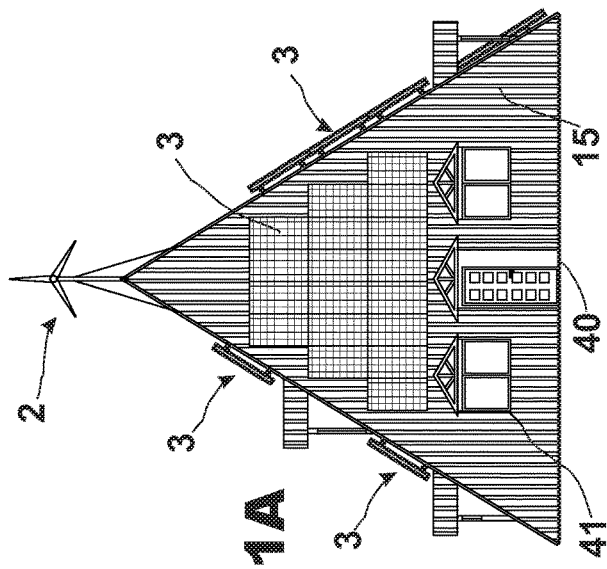
Figure 1C:
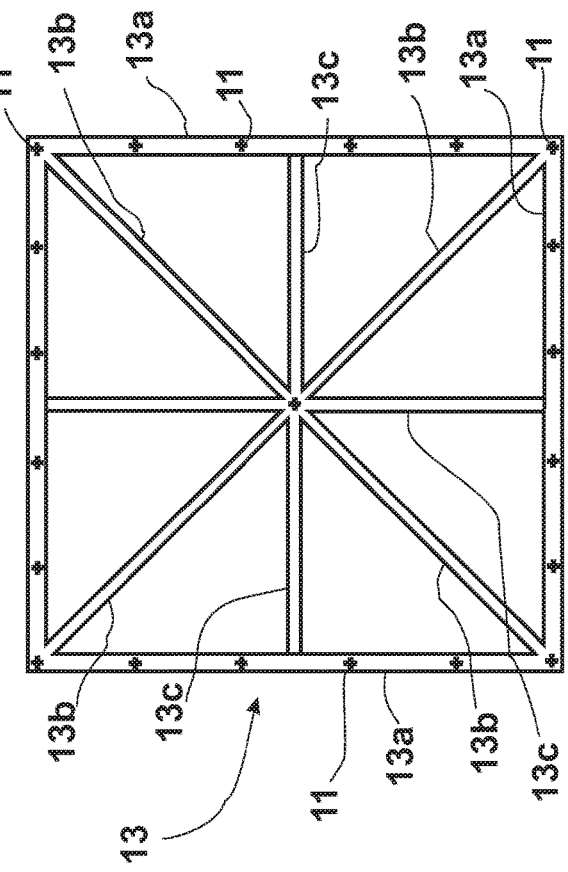
Figure 2:
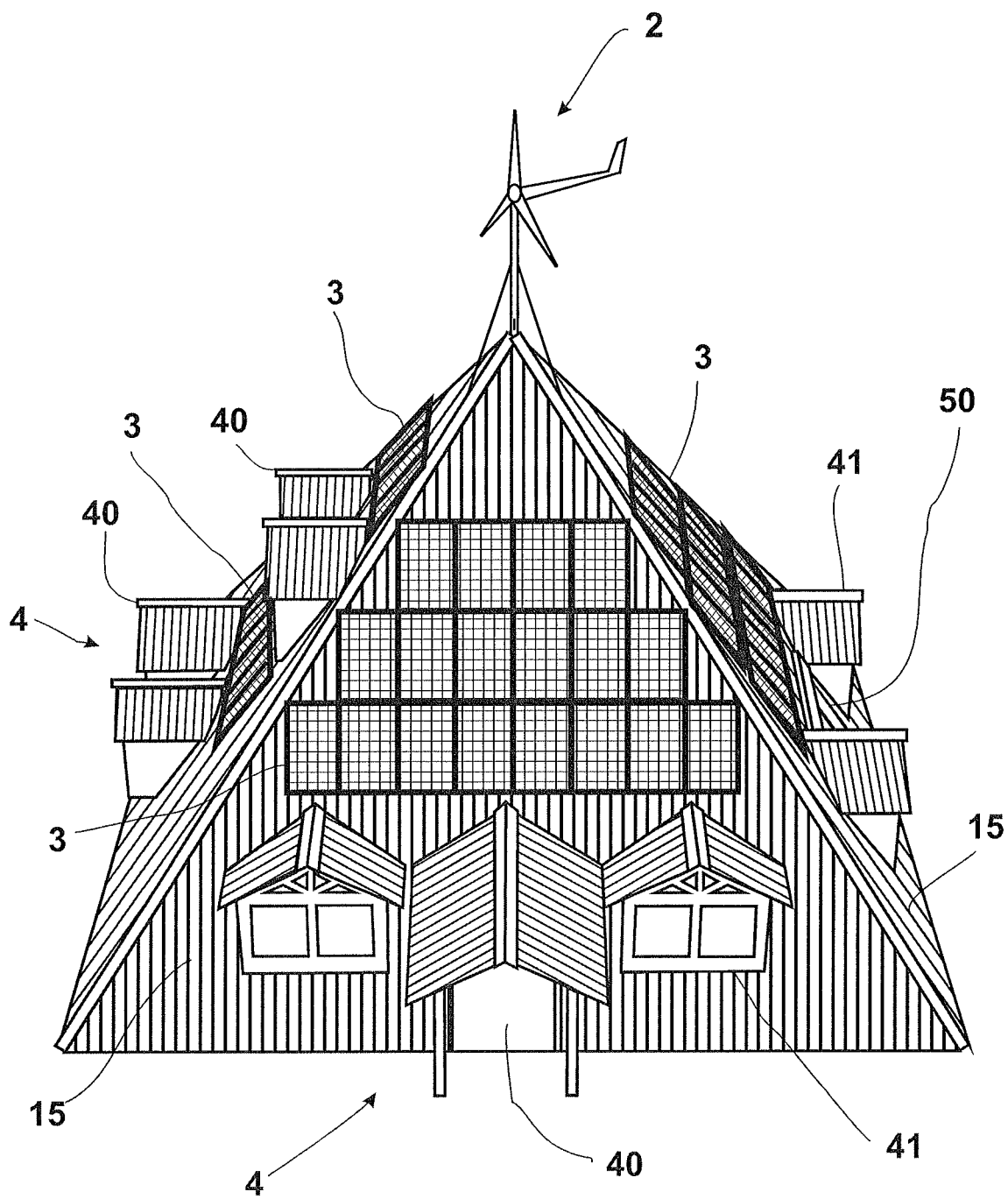
FIG. 2 is an upper view, in perspective, of the present pyramidal housing, in which the mounting of the parts such as solar panels, wind generators and solar heater can be seen.
Figure 3:
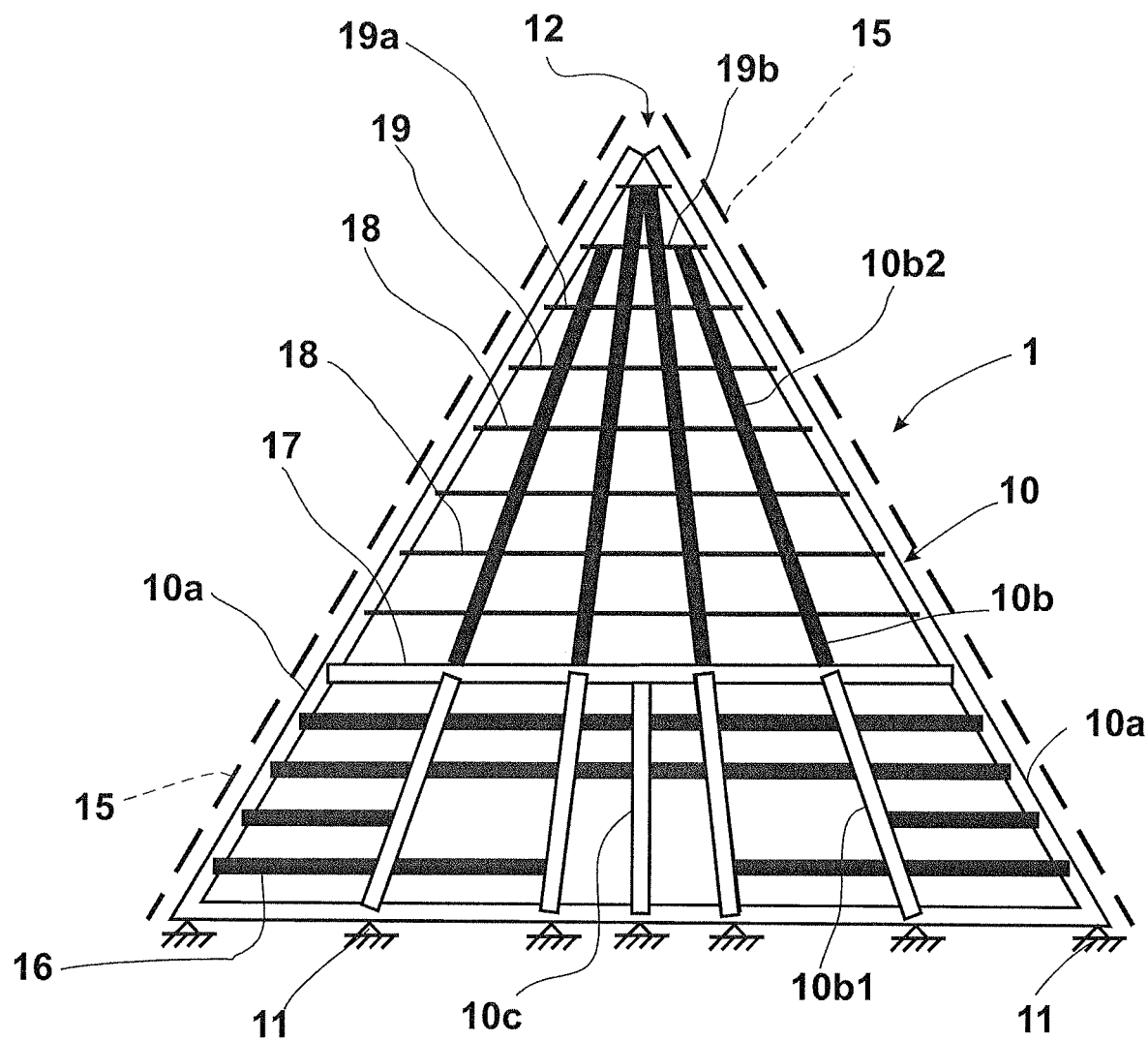
FIG. 3 is a front view, in elevation, of the pyramidal structure made up of metal profiles that is shown deprived of the side walls and its outer cover. This last one has been represented with dashed lines.
Figure 4:
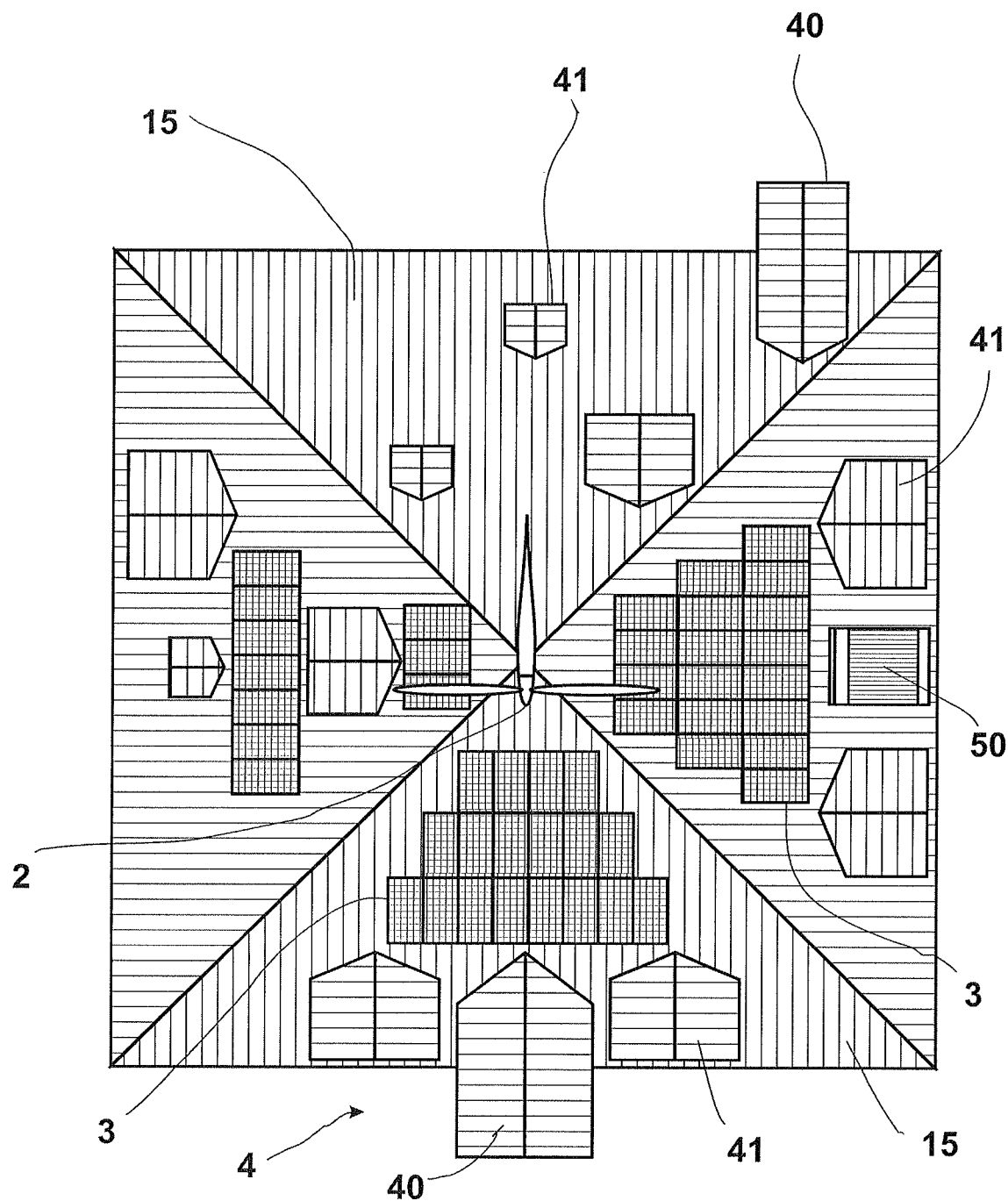
FIG. 4 is an upper view, in plant, of the present pyramidal housing that allows the observation of the placing of the different openings as well as the different blind sections in which the solar panels and solar heaters arrangements are mounted. The wind generator is placed at the apex.
Figure 5:
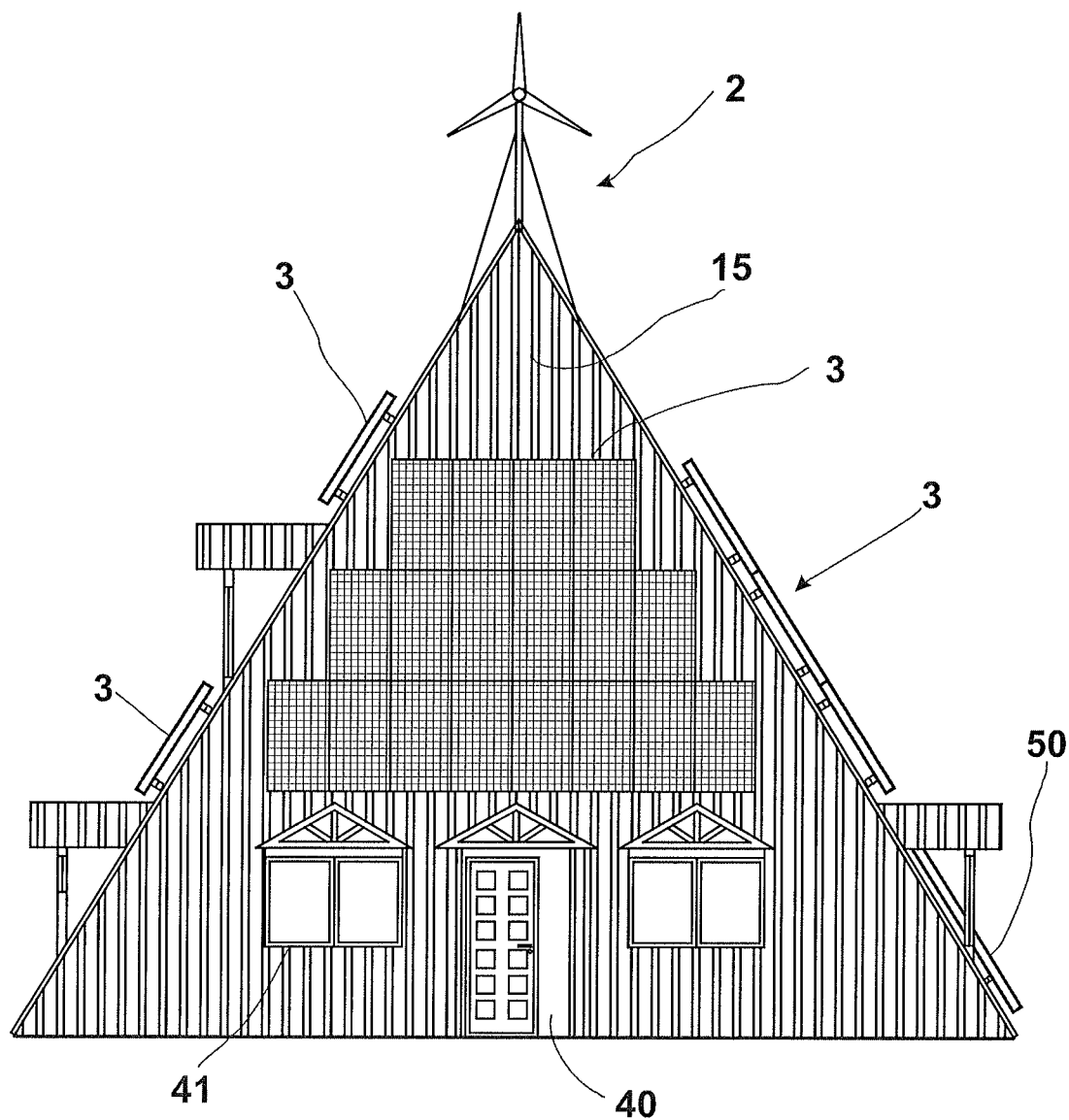
FIG. 5 is a front view, in elevation, of the present autonomous pyramidal housing. It can be seen that an arrangement of the solar panels is mounted in the blind section of the openings of the first floor.
Figure 6:
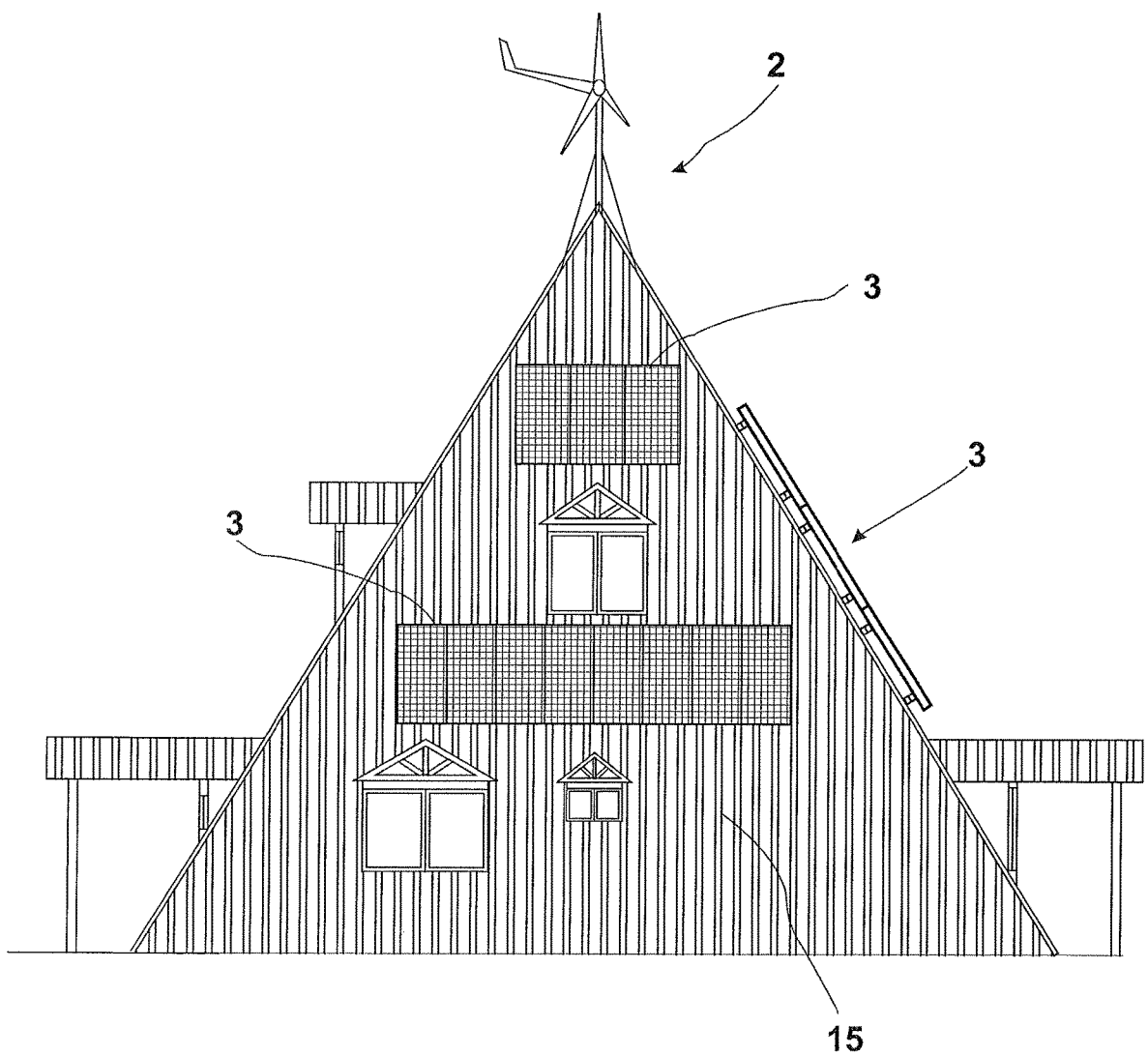
FIG. 6 is a left side view, in elevation, in which the mounting of the solar panels can be seen in two blind sections of the first floor (below and above the window opening).
Figure 7:
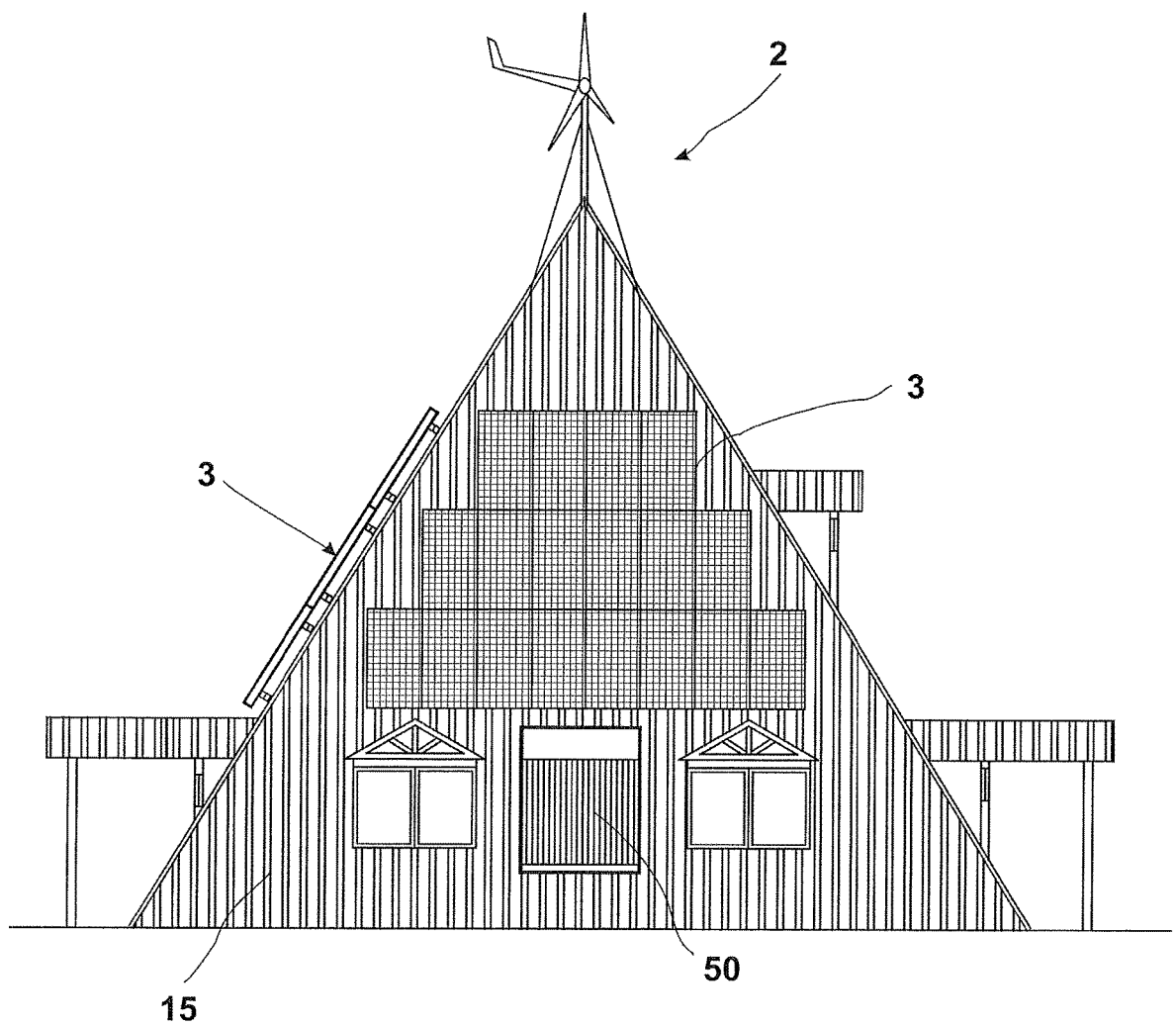
FIG. 7 is a right side view, in elevation, in which the mounting of the solar panels can be seen in all the blind section of the first floor. The solar heater is arranged in the blind section of the ground floor (between two window openings).
Figure 8:
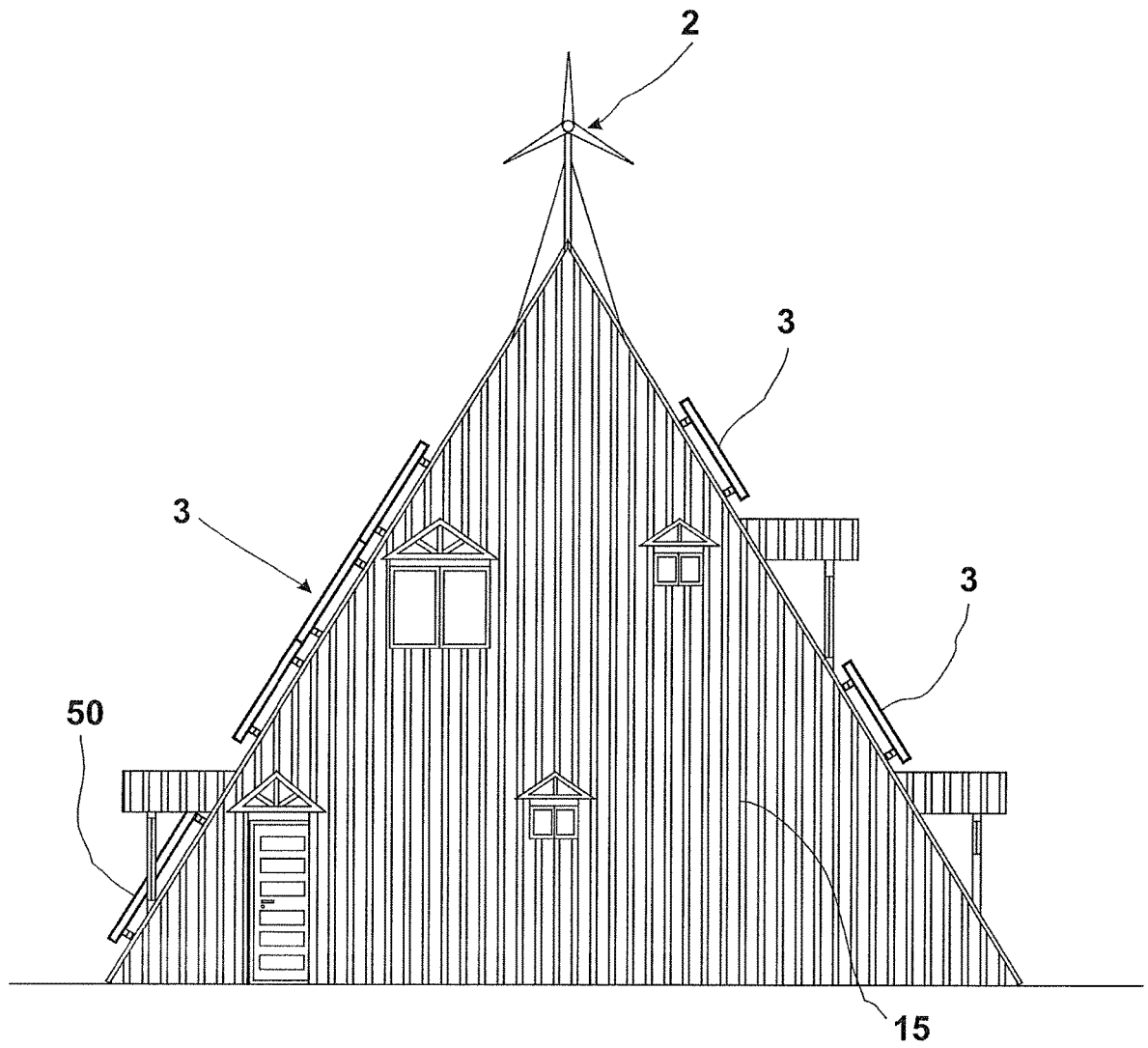
FIG. 8 is a rear view, in elevation, in which it can be seen that the openings leave blind sections that are available for a subsequent use.
Figure 9A:
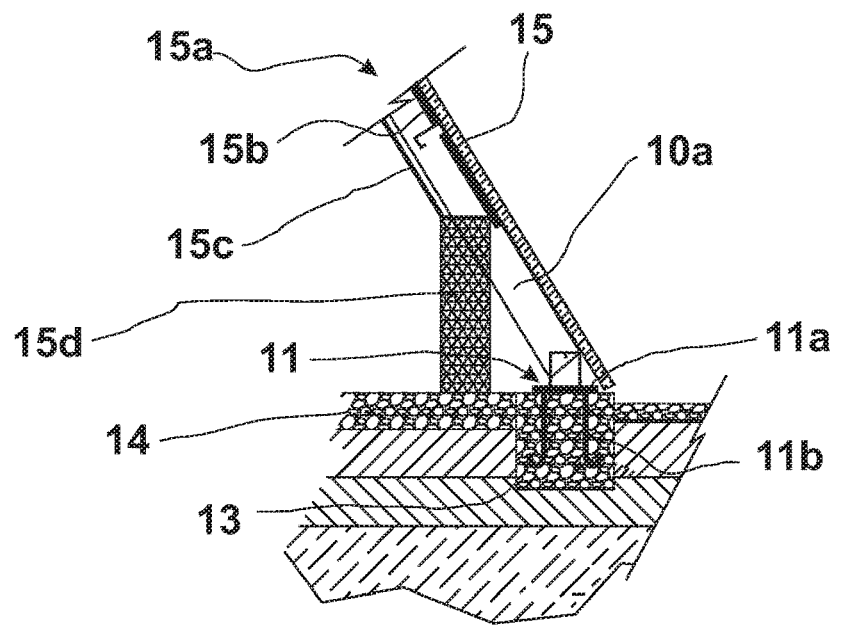
FIGS. 9A-9B show details of a corner pillar, being.
Figure 9B:
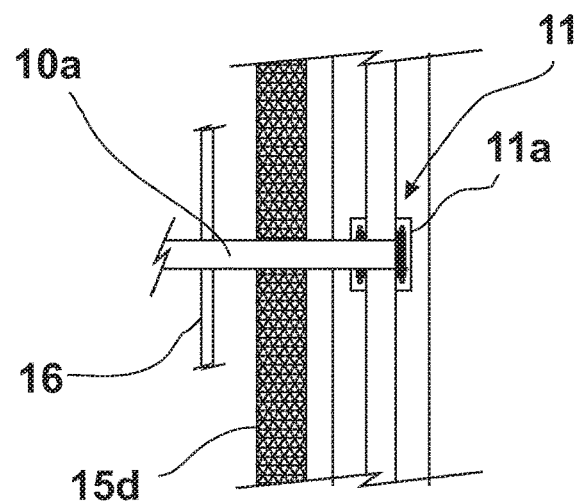

FIG. 9A, a partial longitudinal cut of a pyramidal wall and the anchorage of the foundation beam of a corner pillar and FIG. 9B, a partial cross cut of the same corner pillar.

Figure 10A:
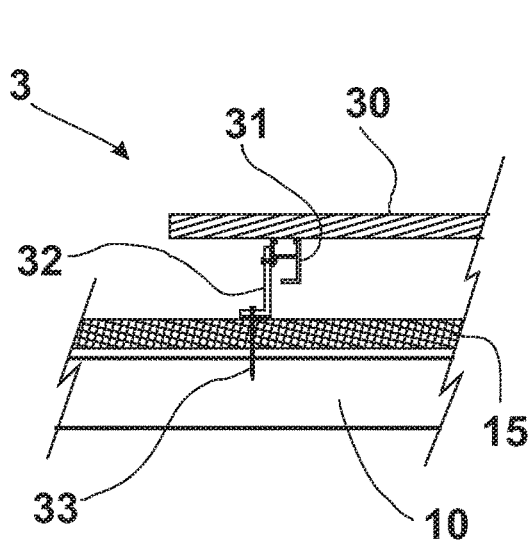
Figure 10B:
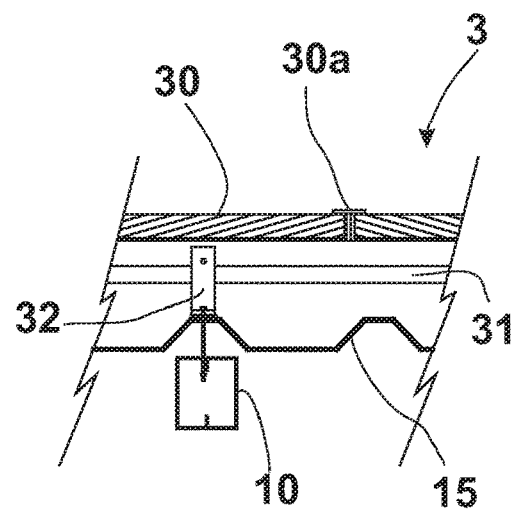

FIGS. 10A-10B show the detail of the mounting of the solar panels, being:

FIG. 10A, a partial longitudinal cut that shows the detail of the mounting of an arrangement of the solar panels in the metal pyramidal structure and FIG. 10B, a partial cross cut that shows the detail of the same mounting of solar panels in the metal pyramidal structure.

Figure 11A:
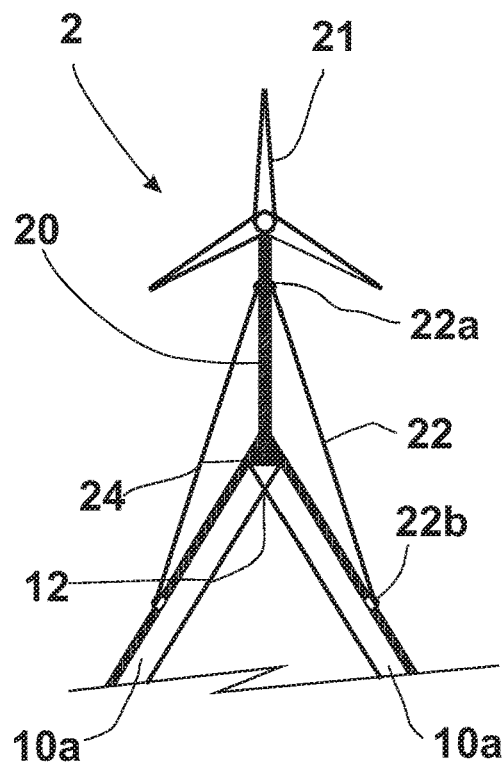
Figure 11B:
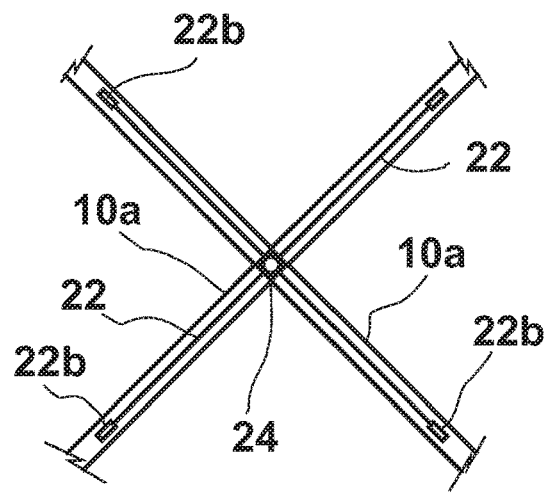

FIGS. 11A-11B show views of a wind generator, being:

FIG. 11A, a side view, in elevation, of a wind generator which impeller is constituted by a propeller and FIG. 11B, an upper view, in plant, of the apex of the pyramidal structure in which the turnbuckles system can be seen.

FIGS. 12A-12C show views of another wind generator, being:

FIG. 12A, side view, in elevation, of a wind generator which impeller is constituted by an arrangement of the peripheral warped blades and FIG. 12B, a perspective view of the warped blades with their positioning mechanism, in an embodiment in which the ends of said blades are of open profile and FIG. 12C, a perspective view of the warped blades with their positioning mechanism in an embodiment in which the ends of said blades are of closed profile.

Figure 13:
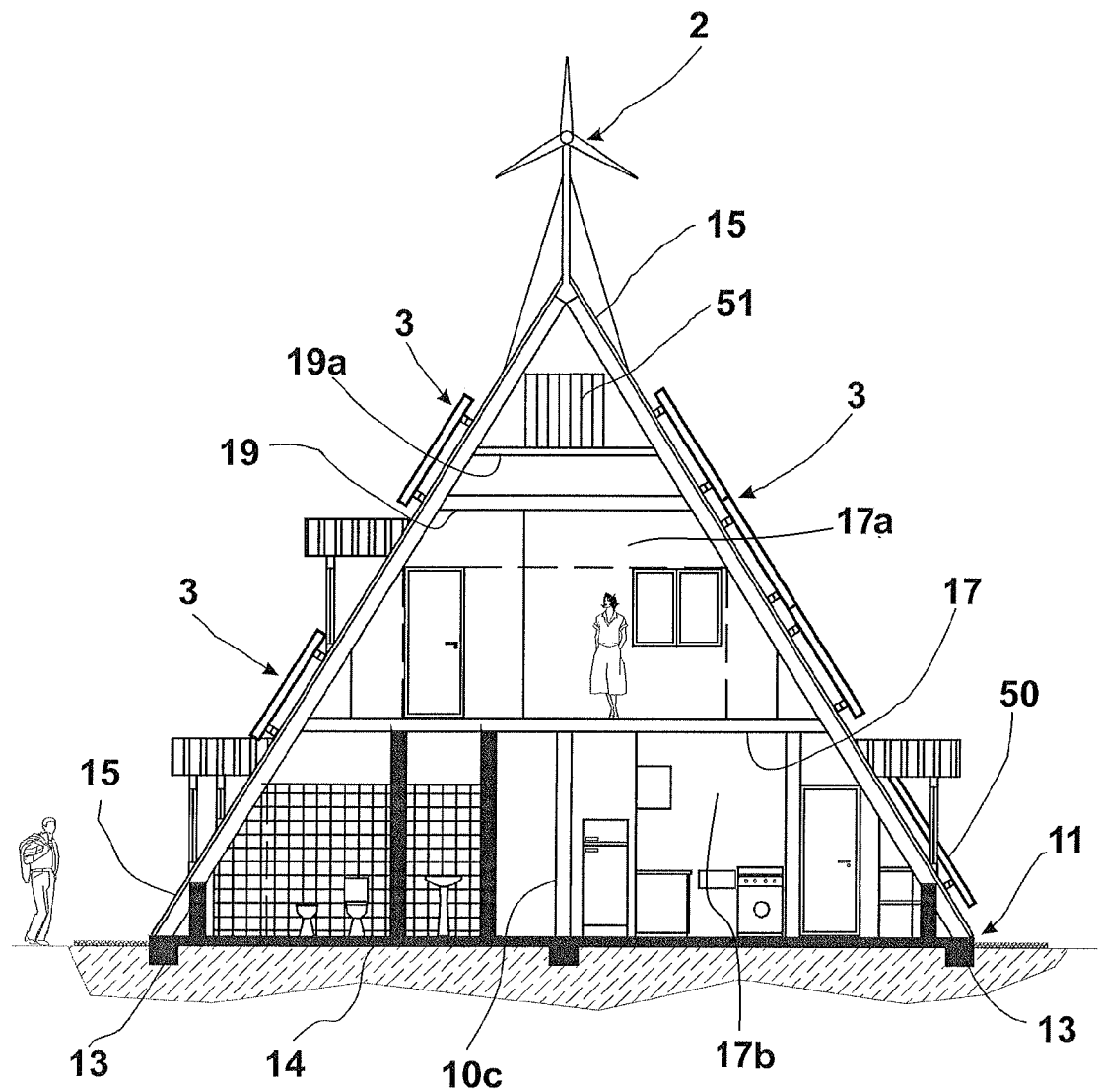

FIG. 13 is a longitudinal cut of the housing that allows the appreciation of the existence of a compartment in the ground floor, a compartment in the upper floor or first floor and an upper attic place.

FIGS. 14A-14C are schematic representations of the electric circuit of the pyramidal housing, being:

FIG. 14A, a schematic representation of the electric circuit of the pyramidal housing, in the case of a self-sustaining unit;

FIG. 14B, a schematic representation of the electric circuit of the pyramidal housing, in the case of a self-sustaining unit and with connection to an electric supply grid and FIG. 14C, a schematic representation that shows an electric connection for a housing that, apart from connecting to a supply grid, is connected to a grid to which it delivers its surplus energy generation.

Figure 15:
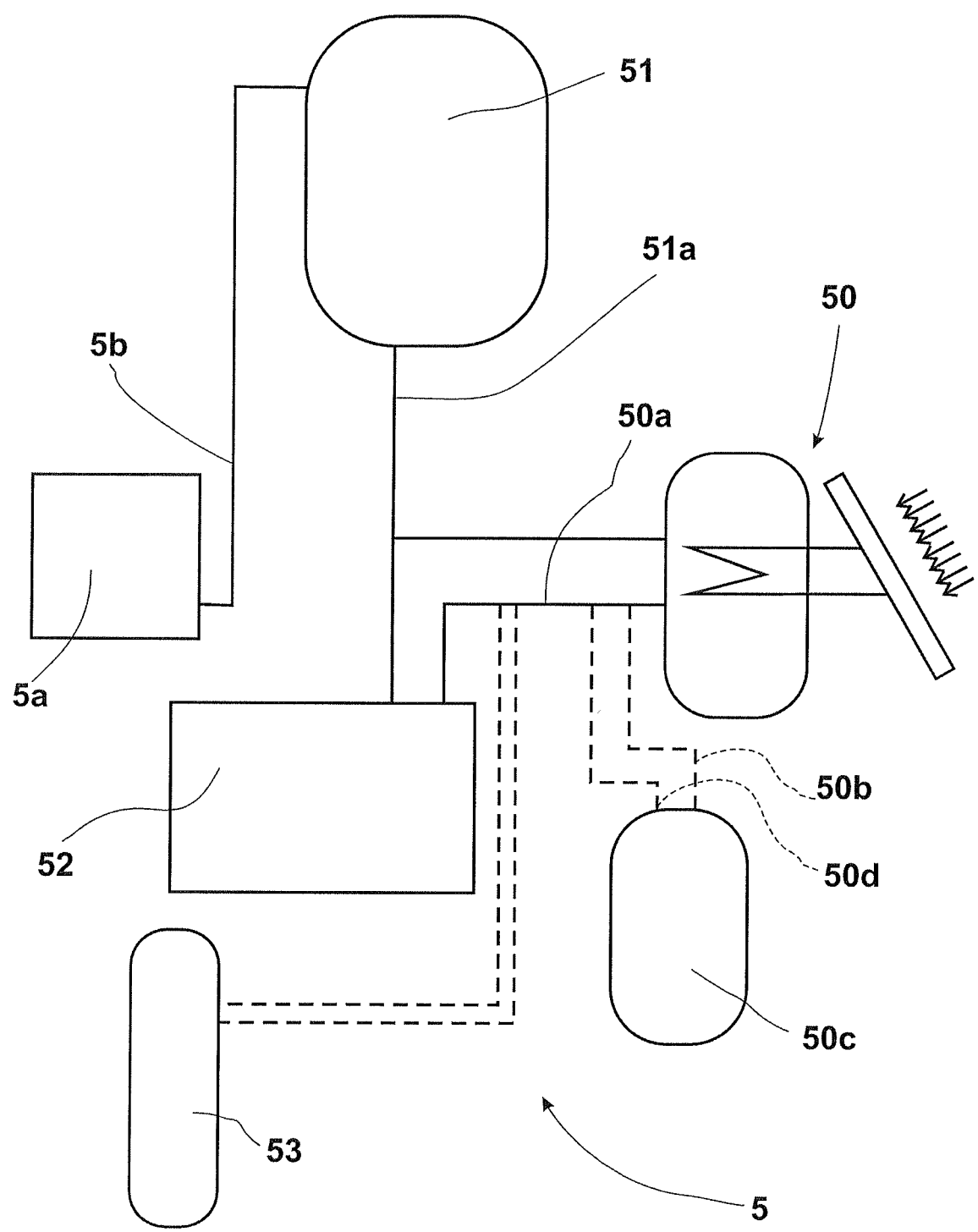

FIG. 15 is a schematic representation that shows the water installation of the housing with its different components.

Figure 16C:
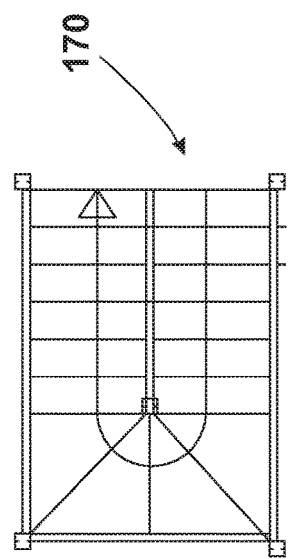
Figure 16D:
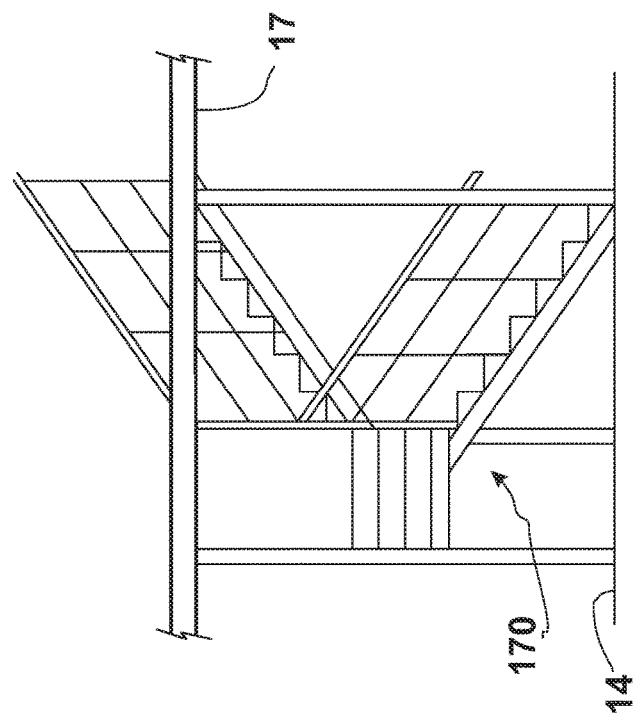
Figure 16B:
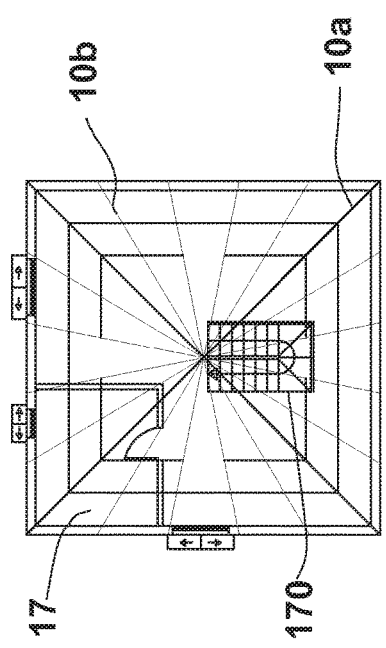
Figure 16A:
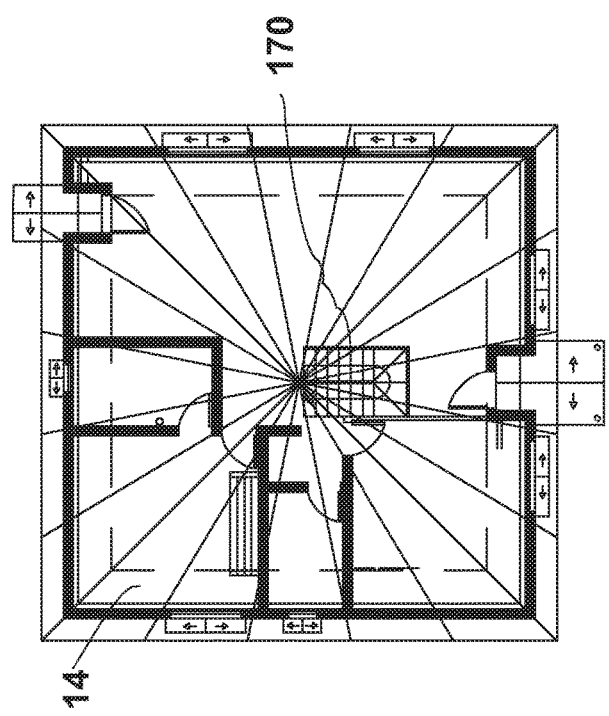

FIGS. 16A-16D show views of the arrangement of the stairs, being:

FIG. 16A, an upper view, in plant, of the bottom compartment in which central part the arrangement of the stairs that communicates it with the upper compartment can be observed;

FIG. 16B, an upper view, in plant, of the upper compartment in which central part the arrangement of the stairs that communicate it with the bottom compartment can be observed;

FIG. 16C, a side view, in elevation, of the stairs that communicate both compartments, and FIG. 16D, an upper view, in plant, of said stairs.

In the different figures, the same numbers and/or reference letters indicate equal or corresponding parts.

LIST OF THE MAIN REFERENCES (1) Pyramidal structure.
(10) Metal profiles.
(10a) Corner pillars.
(10b) Side pillars.
(10b1) Bottom section [higher thickness walls].
(10b2) Upper section [lesser thickness walls].
(10c) Central pillar.
(11) Foundation anchorage.
(11a) Plates or plaques.
(11b) Anchorage bar.
(11c) Hooked anchorage end.
(12) Pyramidal apex.
(13) Foundation beam.
(13a) Peripheral sections of the beam (13).
(13b) Diagonal sections of the beam (13).
(13c) Cross sections of the beam (13).
(14) Pad foundation.
(15) Outer cover.
(15a) Side walls.
(15b) Filling or insulation cover.
(15c) Inner cover.
(15d) Inner masonry wall.
(16) Bottom side crossbeams.
(17) First cross structure [mezzanine floor].
(17a) Bottom compartment [or ground floor].
(17b) Upper compartment [or upper floor].
(170) Stairs [for the circulation between compartments (17a)(17b)].
(18) Upper side crossbeams.
(19) Second cross structure [of functional attic]
(19a) Structure of upper support.
(19b) Side crossbeams of the apex.
(2) Wind generator.
(20) Mast.
(21) Wind thrust propeller
(22) Turnbuckles system.
(22a) Upper anchorage of turnbuckles.
(22b) Bottom anchorage of turnbuckles.
(23) Warped blades of wind thrust.
(23a) Positioning mechanisms of the blades (23).
(24) Wind mounting basis.
(3) Arrangement of photovoltaic solar panels.
(30) Solar panel.
(30a) Connectors between solar panels.
(31) Mounting guides.
(32) Mounting supports.
(33) Fixing means [to the metal structure (1)].
(4) Opening or spans.
(40) Doors.
(41) Windows.
(5) Water installation (5).
(5a) Water inlet.
(5b) Water inlet circuit.
(50) Solar water heater.
(50a) Hot water supply circuit.
(50b) Entry to tank circuit.
(50c) Auxiliary tank of hot water.
(50d) Exit of tank circuit.
(51) Feed tank of cold water.
(51a) Cold water feed circuit [to distribution to taps and devices (52) and to a solar heater (50)].
(52) Distribution to taps and devices.
(53) Tank water heater.
(6) Electrical installation.
(60) Control circuit.
(61) Feed circuit.
(62) Storage device.
(63) Power supply.
(64) Surplus generation and feed control device.

DESCRIPTION

Generally speaking, the present utility model refers to a pyramidal housing autonomous and suitable for different environmental conditions, the pyramidal structure(1) of which is made up of metal profiles (10) that include corner pillars (10a), side pillars (10b), beams and cross structures of mezzanine (17)(19) and the rafters that form the openings (4), being the pillars anchored to the foundation beam (13); over this structure, the outer covers (15) that form the pyramidal walls (15a) are mounted; in the blind sections of the outer cover (15) of the upper floor there are mounting supports (32) for arrangements of solar panels (30), while at the apex (12) there is a wind energy generator; other blind sectors allow the mounting of a solar heater (50).

DETAILED DESCRIPTION

This housing includes a pyramidal building structure (1) which structural elements are set over a concrete pad foundation (14) and foundation beams.

More particularly, the pyramidal structure (1) is made up of metal profiles (10) that include corner pillars (10a), side pillars (10b), cross beams of the mezzanine floor and rafters that form the openings (4).

The corner pillars (10a) and the side pillars (10b) are arranged so as to define the conformation of the pyramidal structure (1). This is due to the fact that they are arranged inclined and with their upper ends converging at the apex (12), while the bottom ends are anchored to the foundation beam (13).

This strong link or anchorage (11) of the pillars to the foundation beam (13), is made through the base metal plates (11a) and anchorage bars (11b) with their ends (11c) directed to opposite sides that, for example, may be of "J-L" type (mentioned this way due to the analogy with the letters "J-L" with the hooks formed at the ends (11c) and directed to opposite sides).

This type of link of the pillars with the foundation beam (13), forms part of the elements that grant firm earthquake resistance to the pyramidal structure (1).

On the other hand, the corner pillars (10a) and side pillars (10b) are related through a plurality of side crossbeams, which include bottom side crossbeams (16) and upper side crossbeams (18).

In a preferred embodiment, the pyramidal building structure (1) includes a bottom compartment (17a) of ground floor and an upper compartment (17b) or upper floor, that are delimited by a first cross structure (17) of mezzanine floor. This first cross structure (17) of bottom mezzanine floor that, preferably, shall have the concurrence of at least one central pillar (10c).

On its part, the upper part of the upper compartment (17b) or upper floor is delimited by a second cross structure (19) of upper mezzanine floor.

The possibility that the second cross structure (19) of upper mezzanine floor forms a structure of functional attic that may be used to arrange different elements has been foreseen. For example, the placing of an upper support structure (19a) for a water tank.

The mentioned compartments (17a) (17b) are communicated through a stair (170) that is integrated with the metal structure.

As has been already mentioned, the building pyramidal structure (1) is a mainly metal and earthquake resistant structure which corner pillars (10a), side pillars (10b), bottom and upper side crossbeams(16) (18), first cross structure (17) of bottom mezzanine and second cross structure (19) of upper mezzanine may be structured in metal profiles (10).

For example, in an embodiment in which the following elements are arranged:
  Corner pillars (10a) structured with double "C" profiles welded with their open longitudinal faces confronted,
  Side pillars (10b) structured with double "C" profiles welded with their open longitudinal faces confronted,
  A plurality of bottom crossbeams that link with the bottom sections (10b1) of said corner (10a) and side pillars,
  A plurality of upper crossbeams that link with the upper sections (10b2) of said corner (10a) and side pillars,
  A first cross structure (17) of bottom mezzanine formed by double "C" profiles and
  A second cross structure (19) of upper mezzanine formed by "C" profiles.

The possibility that the side pillars (10b) be structured with double "C" profiles which walls are of higher thickness until their union with the bottom mezzanine and which walls are of lesser thickness from said bottom mezzanine and until the apex (12) has also been foreseen.

In an embodiment, the metal profiles (10), forming the pyramidal structure (1), may have the following dimensions:
  "C" metal profiles (10) of the second cross structure (19) of the upper mezzanine, of the support structure (19a) and of the apex side crossbeams (19b) of the first floor: 120-50-15-2.5;
  Double "C" metal profiles (10) of the corner pillars (10a), of the bottom side crossbeams (16) that form the first cross structure (17) of the bottom mezzanine, of the bottom side crossbeams (16) and of the bottom sections (10b1) of the side pillars (10b): 180-80-20-3.2; and
  Double "C" metal profiles (10) of the upper sections (10b2) of the side pillars (10b), of the other side crossbeams (16) of the ground floor and of the central part of the first (17) structure of bottom mezzanine: 120-50-15-2.5.

In another embodiment, for areas of greater seismic activity, the metal profiles (10) that form the pyramidal structure (1) may have the following dimensions:
  "C" metal profiles (10) of the second cross structure (19) of the upper mezzanine, of the support structure (19a) and of the side crossbeams of the apex (19b) of the first floor: 140-60-20-2.5;
  Double "C" metal profiles (10) of the corner pillars (10a), of the bottom side crossbeams (16) that form the first cross structure (17) of bottom mezzanine, of the base side crossbeams (16) and of the bottom sections (10b1) of the side pillars (10b): from 200-80-20-3.0 to 220-80-20-3.2; and
  Double "C" metal profiles (10) of the upper sections (10b2) of the side pillars (10b) and of the central part of the first structure (17) of the bottom mezzanine: 140-60-20-2.5.
  Double "C" metal profiles (10) of the other side crossbeams (16) of the ground floor: 160-60-20-3.0.

In the outer part of the housing, over said pyramidal structure (1) the outer covers (15) that form the pyramidal walls (15a) of said structure are mounted.

In the present embodiment, the main mounting areas for arrangement of solar panels (30) are formed by the blind sections that are over the first cross structure (17) of mezzanine.

As an alternative, one of the walls (15a) of the first floor (generally the one that is oriented to the south) may be completely blind, being therefore completely available for the mounting of the arrangements of solar panels (30).

The mentioned outer cover (15) is fixed to the metal profiles (10) of the building pyramidal structure (1).

In a preferred embodiment, said outer over (15) is made of a conformed metal sheet that forms the pyramidal walls (15a). In this way, said pyramidal walls (15a) include an outer cover (15), an intermediate insulating filling and an inner cover (15c). The intermediate insulating filling (15b) may include polyurethane, while the inner cover (15c) shall be formed by plates of components such as plaster and cellulose.

On the other hand, the determination of blind sections of the outer covers (15) that are free of openings (4), such as doors (40) and windows (41), provides mounting areas for the arrangements of solar panels (30).

The mounting of these arrangements is possible because some mounting supports (32) fixed to the pyramidal structure (1) of metal profiles (10) are available These mounting supports (32) are projected from the outside of the outer cover (15) until connecting with the mounting structure of the arrangement (3) of solar panels (30). Said mounting structure of the arrangements includes guides (31) and connectors (30a), through which the solar panels (30) are grouped in each arrangement (3).

In the upper part of the pyramidal structure (1), more precisely in its apex (12), a wind generator (2) is arranged, that, in an embodiment, is mounted at the apex (12) through a support structure that includes a mounting basis 24 and a turnbuckle system (22). Said turnbuckles have bottom anchorages (22b) in the pyramidal structure (1) and upper anchorages (22a) in the mast (20) that form the wind generator (2).

In the upper end of the mast (20) in which upper part the impeller of the mentioned wind generator (2) is mounted in rotation.

In an embodiment, a generator which impeller includes a propeller (21) formed by blades is used.

In another embodiment, a generator which impeller includes an arrangement of peripheral warped blades (23) that may have a positioning mechanisms (23a) for, for example, its deployment and retraction is used.

In both cases, the impeller drive shaft is connected to a dynamo or electric generator that transforms the rotary energy of the drive shaft into electric power that is supplied to the electric installation (6) of the housing.

From the point of view of the structure, the reserve of a compartment capable of accommodating an arrangement of electric power storage batteries has been foreseen, that are at the service of the arrangement (3) of solar panels (30) and wind generator (2).

In this way, the electric installation (6) is connected to the wind generator (2) and to the arrangement (3) of solar panels (30). It is also connected to a storage device (62) fed by said wind generator (2) and by said arrangement (3) of solar panels (30). Afterwards, the installation has a converter device (of the generated direct current into alternated current, with which the inner distribution grid is finally supplied), a feed circuit (61) and control (60), protection and drive means.

In case the housing is not completely self-sustaining, it has connection means to an external power supply (63).

On the other hand, the connection means to an external grid may be just of feeding (61) or also include an inlet connected to an external power supply (63) and an exit to a collection grid of the surplus electric power that, above consumption, is generated and supplied to the external grid by the wind generator (2) and the arrangement (3) of the solar panels (30). To this end, a control device of feed and surplus generation (64) shall be available.

In addition to the electric installation (6), the housing has a water installation (5) that may include a water inlet (5a) connected to a water feed tank (51), at which exit there is a first water inlet circuit (5b) that connects the inlet with the feed tank (51). Furthermore, there is a feed circuit of cold water that connects the mentioned feed tank (51) with a heater device and with a distribution (52) of cold water to taps and devices.

It has been foreseen that de heater device can be formed by a solar heater (50) that is mounted in the outer part of the housing, for example, in a bling section of the outer cover (15), at ground floor level.

In this case, the cold water supply circuit connects the feed tank (51), on the one hand, with said solar heater (50) and, on the other hand, with a distribution (52) of cold water to taps and devices. On the other hand, the hot water supply circuit (50a) connects the solar heater (50) with the distribution (52) of hot water to taps and devices.

In addition to this arrangement, it is also possible to use an auxiliary deposit (50c) of hot water that, connected to the storage circuit (50b) that connects the solar heater (50) with the distribution (52) of hot water to taps and devices, accumulates the surplus of non-used hot water.

The use of a tank water heater (53) (gas or electric) which inlet receives the water preheated by the solar heater (50) and which exit feeds the distribution (52) of hot water to taps and devices has also been foreseen.

Undoubtedly, upon putting the present invention into practice, modifications may be introduced regarding certain construction details and form, without leaving the essential principles that are clearly explained in the claims below:

I claim:

1. A pyramidal housing comprising:
   a pyramidal structure comprising metal profiles, the metal profiles including corner pillars at corners of the pyramidal structure, side pillars at sides of the pyramidal structure, wherein the corner pillars and the side pillars have bottom ends anchored to a foundation beam and upper ends that converge at an apex of the pyramidal structure, and wherein the corner pillars and the side pillars define the conformation of the pyramidal structure;
       wherein the metal profiles of the pyramidal structure further comprise a plurality of side crossbeams that link the corner pillars and the side pillars, a first cross structure that delimits a first floor and a second floor, and a second cross structure that delimits the second floor and a third floor,
   an outer cover mounted over the pyramidal structure so as to form pyramidal walls,
       wherein the outer cover comprises one or more mounting areas for mounting an arrangement of solar panels, the one or more mounting areas having a mounting support fixed to the pyramidal structure for mounting the arrangement of solar panels; and
   a wind generator provided at the apex of the pyramidal structure by way of a wind generator mounting support.

2. The housing according to claim 1, wherein the foundation beam includes peripheral sections, diagonal sections that are linked with corners formed by the peripheral sections and cross sections that link to opposing ones of the peripheral sections.

3. The housing according to claim 1, wherein the first cross structure includes a central pillar.

4. The housing according to claim 1, wherein the pyramidal building structure is a metal and earthquake resistant structure.

5. The housing according to claim 4, wherein the second cross structure is a functional attic structure.

6. The housing according to claim 5, wherein above the functional attic structure there is a support structure for a water tank.

7. The housing according to claim 4, wherein:
   the corner pillars are structured with double "C" profiles welded with their longitudinal open faces confronted, the side pillars are structured with double "C" profiles welded with their longitudinal open faces confronted,
the side crossbeams comprise a plurality of bottom crossbeams that link with bottom sections of the corner and side pillars,
the side crossbeams comprise plurality of upper crossbeams that link with upper sections of the corner and side pillars,
the first cross structure is formed by double "C" profiles and
the second cross structure is formed by "C" profiles.

8. The housing according to claim 7, wherein a thickness of the pyramidal walls decreases from the first floor to the apex.

9. The housing according to claim 1, wherein the mounting support fixed to the pyramidal structure projects outside the outer cover until connecting with a mounting structure of the arrangement of solar panels.

10. The housing according to claim 1, wherein the corner pillars and the side pillars are linked to the foundation beam through base metal plates and anchorage bars directed towards opposite sides.

11. The housing according to claim 10, wherein the anchorage bars are of "J-L" type.

12. The housing according to claim 1, wherein the wind generator has a support structure that includes:
a mast in which an upper part of a wind impeller is mounted in rotation,
in the bottom part of the mast, a support basis that is mounted in the apex where the pillars converge and
a turnbuckle system that link the mast with the apex.

13. The housing according to claim 12, wherein the wind impeller includes a propeller.

14. The housing according to claim 12, wherein the wind impeller includes an arrangement of peripheral warped blades.

15. The housing according to claim 1, further comprising a compartment suitable for the accommodation of electric power accumulation from the arrangement of solar panels and of the wind generator.

16. The housing according to claim 1, further comprising an electric installation that includes:
an accumulator device fed by the wind generator and the arrangement of solar panels,
an inner distribution grid; and
a control unit.

17. The housing according to claim 16, further comprising a connection to an external supply grid.

18. The housing according to claim 17, wherein the connection to the external grid includes an inlet connected to an external power supply and an exit to a collection grid of the surplus electric power that, above consumption, is generated by the wind generator and the arrangement of the solar panels.

19. The housing according to claim 1, further comprising a water installation that includes:
a water inlet,
a water supply tank,
a first circuit of water inlet that links said inlet with said supply tank,
a water solar heater,
a cold water supply circuit that links said supply tank with said solar heater and with a cold water distribution to taps and devices and
a hot water supply circuit that connects said solar heater with a hot water distribution to taps and devices.

20. The housing according to claim 19, wherein the water installation further comprises an auxiliary hot water deposit that is connected to a storage circuit that connects the water solar heater to the hot water distribution to taps and devices, and the auxiliary hot water deposit accumulates the non-used hot water surplus.

21. The housing according to claim 19, wherein the water installation further comprises a tank water heater connected to a public power grid wherein the water solar heater works as a preheater of the tank water heater.

22. The housing according to claim 1, wherein the one or more mounting areas are formed above the first cross structure.

23. The housing according to claim 1, wherein one of the walls of the first floor is completely available for the mounting of arrangements of solar panels.

24. The housing according to claim 1, wherein the pyramidal walls include an outer cover that is fixed to the metal profiles of the pyramidal structure.

25. The housing according to claim 1, wherein the outer cover is made of conformed metal sheets.

26. The housing according to claim 1, wherein the pyramidal walls include an outer cover, an isolation intermediate filling and an inner cover.

27. The housing according to claim 26, wherein the intermediate isolation filling includes polyurethane.

28. The housing according to claim 26, wherein the inner cover includes plaster and cellulose plates.

29. The housing according to claim 1, further comprising a solar water heater that, mounted over at least one of the pyramidal walls, has a mounting structure comprising a mounting guide and a linking support.

30. A pyramidal housing comprising:
a pyramidal structure comprising metal profiles, the metal profiles including corner pillars at corners of the pyramidal structure, side pillars at sides of the pyramidal structure, wherein the corner pillars and the side pillars have bottom ends anchored to a foundation beam and upper ends that converge at an apex of the pyramidal structure, and wherein the corner pillars and the side pillars define the conformation of the pyramidal structure;
an outer cover mounted over the pyramidal structure so as to form pyramidal walls,
wherein the outer cover comprises one or more mounting areas for mounting an arrangement of solar panels, the one or more mounting areas having a mounting support fixed to the pyramidal structure for mounting the arrangement of solar panels,
a wind generator provided at the apex of the pyramidal structure by way of a wind generator mounting support,
a compartment suitable for the accommodation of electric power accumulation from the arrangement of solar panels and of the wind generator and
a solar water heater that, mounted over at least one of the pyramidal walls, has a mounting structure comprising a mounting guide and a linking support.

* * * * *